United States Patent [19]

Bopst, III et al.

[11] Patent Number: 4,708,265
[45] Date of Patent: Nov. 24, 1987

[54] SYSTEM FOR AUTOMATIC MEASURING AND DISPENSING OF GRAIN AND POWDER FOOD PRODUCTS

[76] Inventors: John H. Bopst, III, 409 Chalfonte Dr., Baltimore, Md. 21228; Joyce M. Zakro, 435 Woodstone West Dr. NE., Marietta, Ga. 30067

[21] Appl. No.: 888,356

[22] Filed: Jul. 23, 1986

[51] Int. Cl.⁴ .......................... B67D 5/22; G01F 11/10
[52] U.S. Cl. ........................................ 222/43; 222/284; 222/355; 222/362; 222/359
[58] Field of Search ........................ 221/94, 264, 265; 222/42, 43, 284, 288, 305–307, 361, 362, 354, 355, 359

[56] References Cited

U.S. PATENT DOCUMENTS

| 919,917 | 4/1909 | McDuffie . | |
|---|---|---|---|
| 1,415,571 | 5/1922 | Hutchins . | |
| 1,864,936 | 6/1932 | Reineking . | |
| 1,988,607 | 1/1935 | Minturn | 222/354 |
| 2,767,889 | 10/1956 | Manrose | 222/284 |
| 2,857,083 | 10/1958 | Masterson | 222/362 |
| 3,227,313 | 1/1966 | Morena . | |
| 3,907,166 | 9/1975 | Bassignani | 222/284 |
| 4,531,658 | 7/1985 | Galopin | 222/361 |

Primary Examiner—H. Grant Skaggs
Attorney, Agent, or Firm—John F. McClellan, Sr.

[57] ABSTRACT

A practical and simple system that automatically measures and dispenses grain and powder type food products, such as sugar and flour contained within a canister type holder. The system consists of a drawer compartmentalized into precisely measured divisions with the topside uncovered and the bottomside selectively covered or uncovered by a moveable slide that allows for the pulling out of the drawer without spillage. The drawer will stop at one of several preset measured positions. These positions are controlled by a spring-pressured arm. With the drawer in a selected position the contents of the outward division or divisions of the drawer are dispensed accurately and immediately by pushing inwardly the moveable slide covering the bottom side. When the drawer is pulled outward an attached trailing horizontal upper slide prevents any of the contents within the canister from filling the empty area behind the drawer when the drawer is pulled out.

7 Claims, 9 Drawing Figures

SYSTEM FOR AUTOMATIC MEASURING AND DISPENSING OF GRAIN AND POWDER FOOD PRODUCTS

FIELD OF THE INVENTION

This invention relates generally to measuring and specifically to measuring and dispensing finely divided food materials such as grain, sugar, and similar food products.

BACKGROUND OF THE INVENTION

For years the market has produced measuring implements that have the measurement quantity shown on the implement, for example; ¼ cup, ⅓ cup, 1 cup or similar type quantities. The user takes the lid off the canister or container holding the sugar or flour, or other finely divided material, digs or dips the measuring implement into same, then adds a little or removes some before turning it over into a receiving container. We have invented our system to provide an immediate and precise measurement device easily and conveniently usable by all without the need for digging with an implement and without the complexity of devices such as those shown in the following U.S. Pat. Nos.:

919,917 to C. J. McDuffie, Apr. 27, 1909, showed a measuring dispenser for granular material that has slides to control quantity of flow;

1,414,571 to F. W. Hutchins, May 2, 1922, showed a dispenser with slides, that operated on the same principle as the Hutchins mechanism;

1,864,936 to F. C. Reineking, June 28, 1932, showed a dispenser on a can with indexing means for setting apart any of several predeterminable amounts of material from a supply in the can, and a spout permitting pouring out the amount selected.

3,227,313 issued to G. C. Morena on Jan. 4, 1966 disclosed a hopper with a vertical series of control gates for dispensing preselectable amounts of material.

SUMMARY OF THE INVENTION

A principal object of the invention is to provide therefore as noted, a simple, reliable dispensing system for finely divided or granular food produces and one that is easy, quick and convenient to use, that protects the contents and provides for free flow, that gives accurate results and is sanitary and easily cleaned.

Further objects are to provide a system as described that requires only a few parts, and those simple and easily made.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
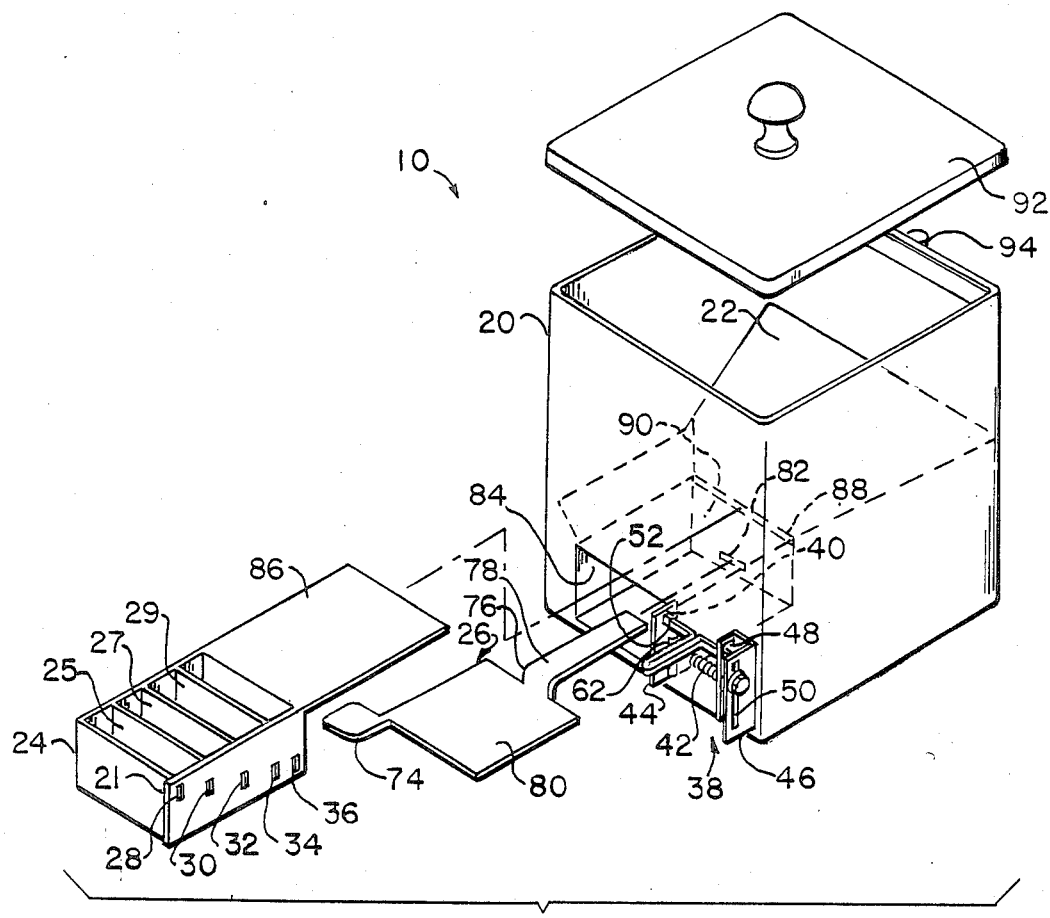
FIG. 1 is an exploded isometric view of a system according to the invention.
Figure 2:
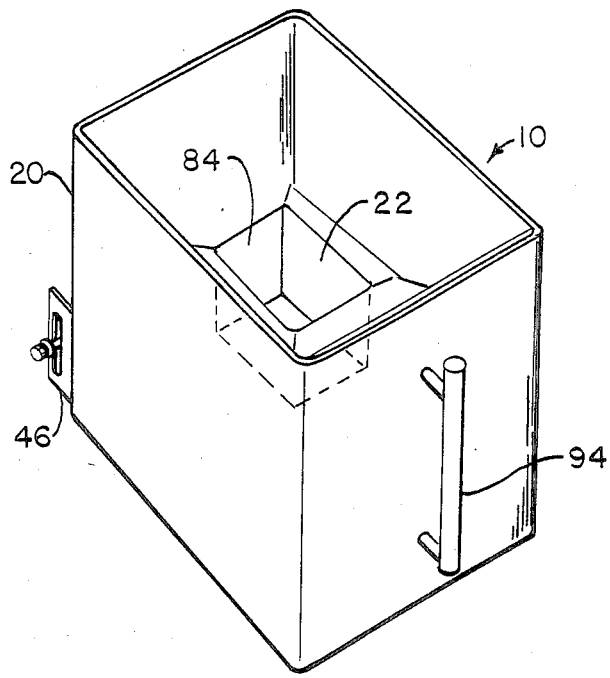
FIG. 2 is a rear perspective view of housing with chute, and with drawer and lower slide removed.
Figure 3:
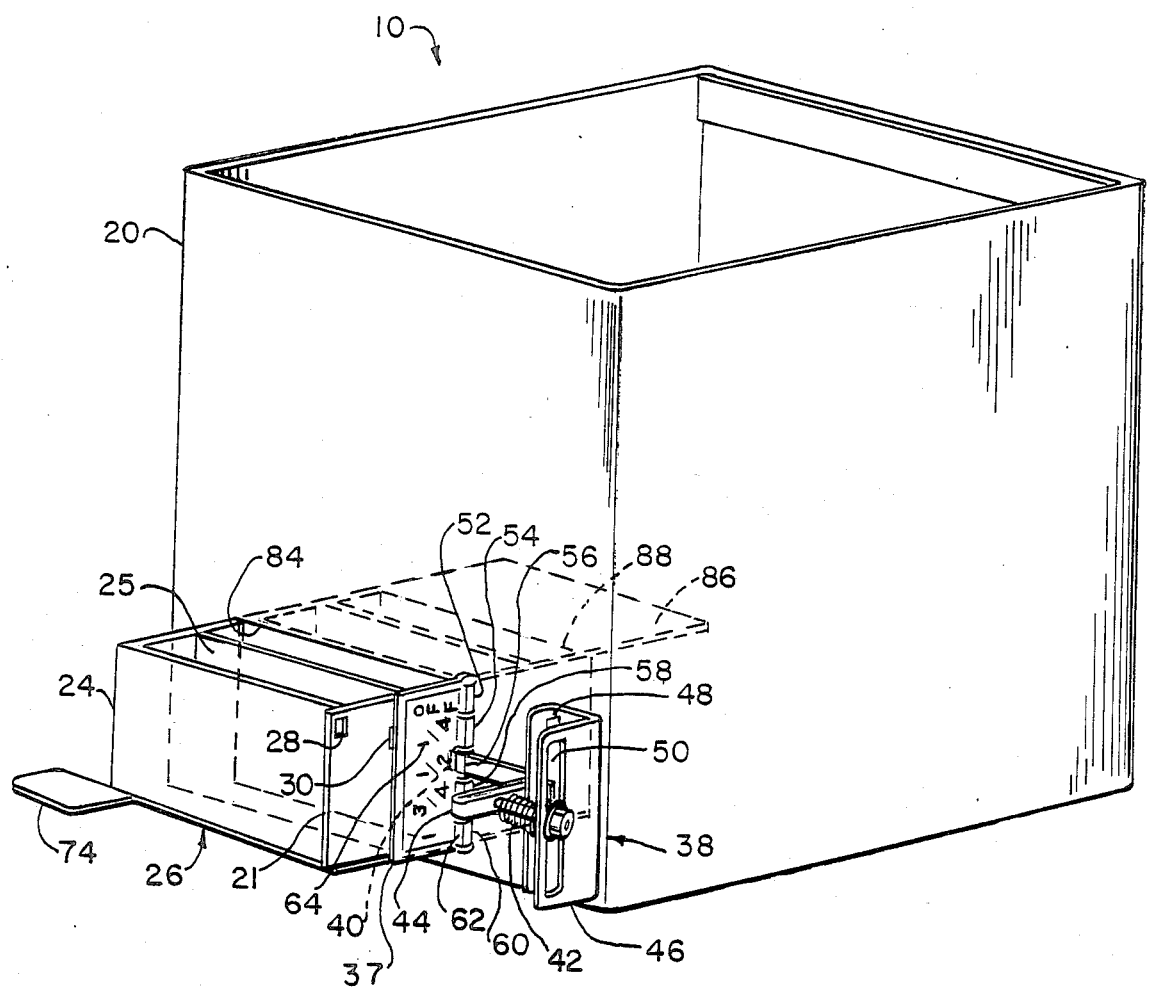
FIG. 3 is an isometric view of the assembly of FIG. 1, without the cover and with the drawer and index assembly in a position of use.

FIGS. 1 through 3 are described together. They show the invention in preferred embodiment 10.

It may comprise a canister or housing 20 and has means defining a vertical chute 22 inside for storage of granular food and for downwardly pouring the granular food into a drawer 24 with a plurality of longitudinally spaced transverse internal partitions 25, 27, 29, shown. Preferably at least five compartments will be provided. The drawer top is never covered.

"Granular" when used herein includes finely divided.

From the open bottom of the drawer 24 granular food can be dispensed by a lower slide 26. The lower slide 26 has sliding lost-motion dispensing relation to the underside of the drawer, for which it forms a movable bottom. Quantity of finely divided or granular food dispensed depends on adjustment of extension of the drawer 24 from the housing 20. This adjustment is made by means of a series of features that may be blind slots 28, 30, 32, 34, 36, spaced along a side of the drawer 24 at decreasing heights, that are selectively engageable by an index mechanism 28 and plate 37 with openings in it.

This side of the drawer may protrude as a leading edge 21 and the associated features 28 may define the zero extension position of the drawer when the index engages it. Index end 40 (index) under the bias of a spring 42, fits into a chosen drawer blind slot 34, for example, and so sets a particular extension of the drawer. The index end 40 is retractable by manually squeezing grip 44 toward bracket 46 against the bias of spring 42. Height setting of the index is variable.

By retracting the index 40 and sliding the mechanism up or down in the guideways 48, 50 provided, the index end 40 will extend through a chosen aperture in a vertical series of apertures 52, 54, 56, 58, 60 in a flange 62 on parallel plate 37 on the housing 20, at locations corresponding to the heights of the blind slots. The locations correspond as indicated to quantities dispensable. This close coupling of the index 40 braces it against dislodging.

Adjacent each aperture is a respective calibration marking, 64 indicated. These markings may conveniently be in the fractions of cups as indicated, increasing the quantity as the drawer 24 is pulled out.

The drawer 24 is pulled out by means of a tab 74 on first slide or lower slide 26. The tab 74 extends laterally from the slide 26 beneath the drawer in convenient position for manual manipulation at all times.

The lower slide 26 serves as a bottom for the otherwise bottomless drawer 24 as indicated, and serves as a means for pulling the drawer 24 out to a pre-determined location for dispensing a pre-determined amount of granular material. For this an angled abutment 76 is provided as a part of a rearward extension 78 of the drawer-bottom-fitting panel 80 of the lower slide 26. Slide 26 must make a smooth, tight fit with the drawer; 80 must fit very tightly to the bottom of the drawer both when pulled out and when pushed in.

The rearward extension 78 fits in slot 82 in the housing and stabilizes sliding operation of the lower slide 26, must fit slot 82 tightly. The rearward extension and the slot may be made as wide as desired for support.

Drawer 24 and the first or lower slide 26 closely fit the rectilinear recess 84 in which they slide.

Upper slide 86 is like the lower panel 80, a rectangular member fitting the recess 84, but at the top of the recess. The slides 26 and 86 should be longer than the drawer for ease in insertion in the slots and for stability. Slide 86 is an integral rearward extension of the drawer 24, that moves in and out with the drawer, but in the upper slot 88, and prevents granular material from flowing downward except into such compartments as may be within the recess 84, so that no spillage occurs.

OPERATION (a) The drawer 24 with upper slide 86 and lower slide 26 are pushed into the housing until they stop against back wall or slotted wall 90;

(b) Cover 92 is removed from housing 20;

(c) Granular material to be dispensed is poured into open top of the housing;

(d) Index 40 is retracted by squeezing grip 44 towards bracket 46;

(e) Index 40 is set at the height corresponding to the blind slot representing the desired quantity of granular material to be dispensed;

(f) Index 40 is released, to enter the selected blind slot chosen when the drawer is pulled out;

(g) Tab 74 is pulled out, pulling drawer 24 out until index 40 fits into the blind slot selected; this is signalled by the snapping under spring force of the first end of the index into the blind slot chosen.

(h) Using handle 94, unit 10 is positioned over any container into which the pre-set quantity of granular material is to be dumped;

(i) Tab 74 is pushed all the way back until abutment 76 strikes slotted rear wall 90 in housing, dumping from the now bottomless drawer the pre-set quantity of granular material;

(j) Index 40 is retracted;

(k) Slide 26 is pulled all the way forward again, to prevent spills;

(l) Drawer 24 and slide 26 with it are pushed all the way in again and will refill drawer 24 as it goes in.

Figure 4A:
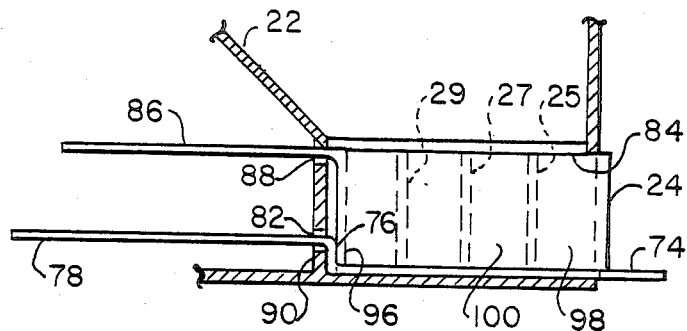
FIGS. 4a, 4b and 4c are successive-position elevational diagrams showing relation of drawer and slide and chute.
Figure 4B:
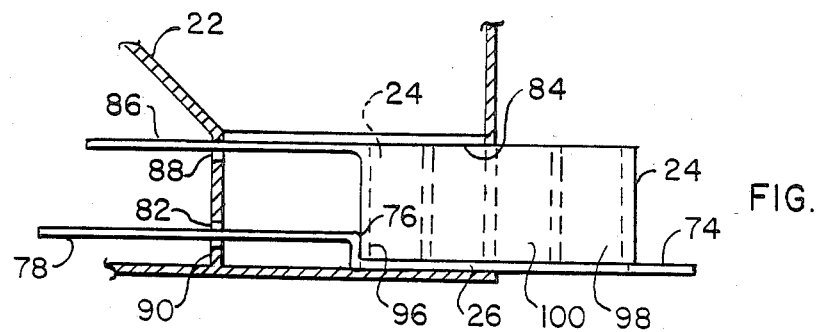
Figure 4C:
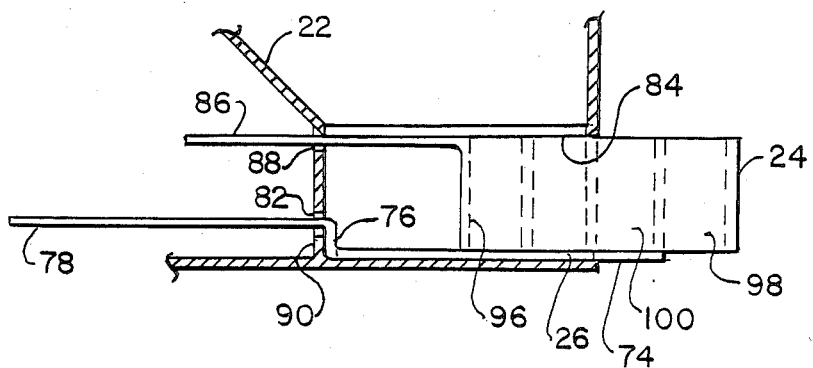

FIGS. 4a, 4b and 4c indicate in vertical sectional diagram major successive positions in a cycle of operation of the drawer. The top of the drawer is open at all times.

FIG. 4a indicates in storage position or initial position the chute 22 having beneath it the fully retracted drawer 24 with the transverse partitions in series at 25, 27, 29.

Upper slide 86 is flush with the upper portion of the drawer 24 and extends as indicated rearwardly from the drawer 24 through upper slide slot 88. Lower slide 78 extends rearwardly from the 90° angle upward abutment 76 engaging the rear 96 of the drawer 24 and extends forwardly and laterally to tab 74, that protrudes from the front of recess 84.

FIG. 4b indicates the drawer 24 partially extended to an operative position at which the two front compartment 98, 100 will be dumped when the lower slide 26 is retracted.

FIG. 4c indicates the position after the compartments have been dumped by pushing all the way to the rear the tab 74 and lower slide 26 of which it is a part. They are then returned forward. The final step will be to push the drawer 24 back into the housing. The compartments being integral with the drawer, will automatically fill as they and the drawer are pushed back. 82 is the lower slide opening in wall 90.

It will be seen that the index limits the outward travel of the drawer and that the drawer limits the outward travel of the lower slide. Slide length of both slides is sufficient to be engaged with the respective slots at all times except when removed for cleaning.

Figure 5:
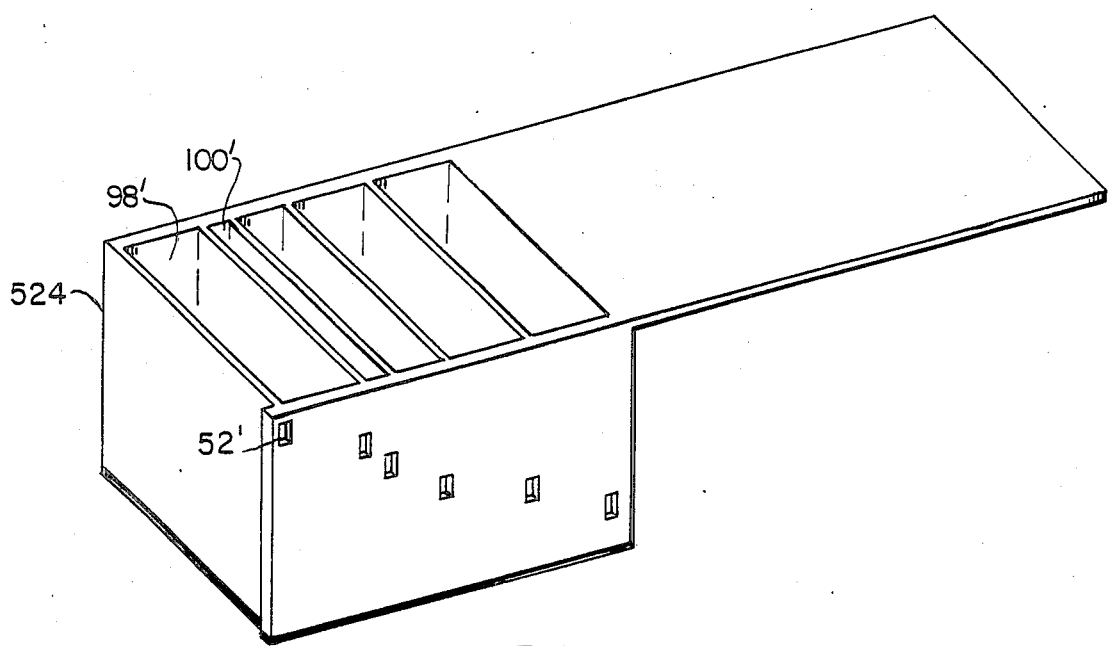
FIG. 5 is a perspective of a drawer variation.

FIG. 5 shows in perspective view that the compartments 98', 100' for example, need not be all the same size, but instead can conveniently be of different sizes and numbers. Only the drawer needs to be changed, giving it partitions of different size, and matching these at the blind slots and at the quantity markings. The drawer is 524. An example of a blind slot is 52'.

All else can remain the same. Separate interchangeable drawers can be provided, changeable on retraction of index 40 (FIG. 1).

CHUTE

Figure 6:
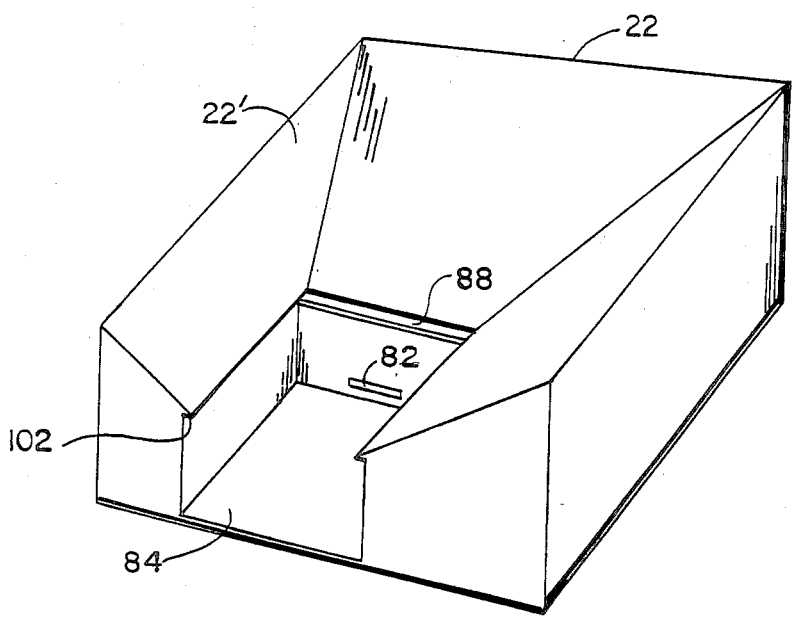
FIG. 6 is a perspective view of a chute.

FIG. 6 shows, in diagrammatic form, chute structure. The chute 22 may be formed by interior down-and-in sloping walls 22' at the sides and rear, leaving room at the rear for the upper and lower slots 88, 82 and has, at the bottom recess 84.

The housing may be integral with the chute, or the chute may be, as shown here and preferred, a separate piece that fits down in the housing, in which case the two pieces may be adhesively affixed if desired, or left separate for easier cleaning. The housing may have a plain flat bottom or no bottom. These two elements, or one element if made together may be metal stampings or injection moldings. The drawer may be of similar construction. To prevent spillage, the chute structure may have flanges as at 102 that overhang the edges of the drawer.

FURTHER DETAILS: INDEX MOUNT AND BIAS

Figure 7:
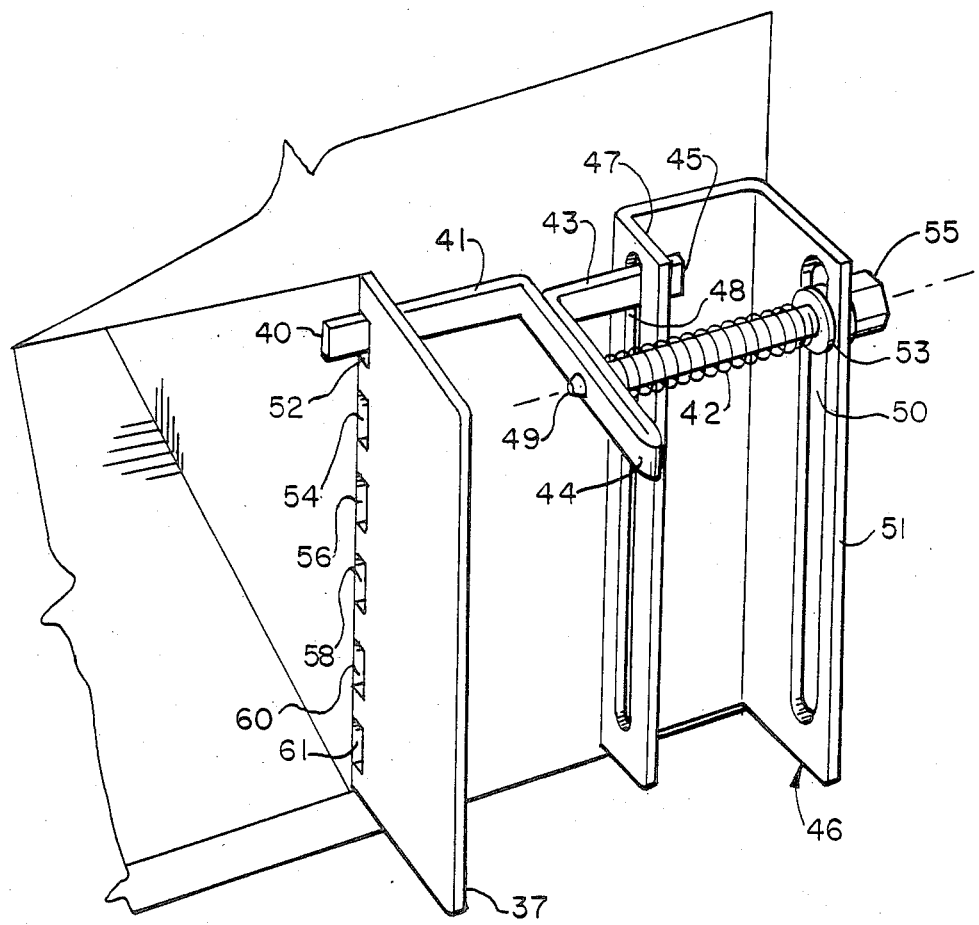
FIG. 7 is a perspective view of an indexing mechanism.

FIG. 7 is a perspective view of the index mechanism on a larger scale. The index 40 preferably is at a first end of a one-piece strap 41 that from the first end extends back to the grip 44, a tight "V"-shaped angle with the leg of the "V"-shape leading to the first end supported against the housing and with the leg 43 leading to the second end 45 shorter and supported on the bracket 46 in first guideway 48, that is formed in the shorter leg 47 of the "U"-shaped bracket 46.

Midway of the length of the grip 44 a pin 49 is fixed. The pin 49 compresses the compression spring 42 between the grip 44 and the longer leg 51 of the bracket, which has a second guideway 50. A washer 53 separates the spring from the inner face of the longer leg of the bracket at guideway 50, and a "Tinnerman" (trademark) nut or other conventional push-installation nut 55 on the outer end of the pin 49 retains it in the second guideway 50.

The apertures 52, 54, 56, 58, 60, 61 correspond in number and spacing to the blind slots shown in FIG. 5 in the drawer.

The construction and materials possible to use should make this invention a very attractive unit when manufactured.

Thermoplastic or ceramic material or enameled metal are among the suitable materials.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for dispensing finely divided material and having structure defining:

a housing, a chute in the housing for containing finely divided material, the chute opening into a recess below the chute, a drawer in the recess for receiving finely divided material from the chute and slidable from a position in the recess to a selectable plurality of positions of partial outward extension from the recess, each position corresponding to a selectable quantity of finely divided material, the drawer having open top and open bottom and a series a vertically fixed members dividing the drawer into a plurality of compartments defining said selectable quantities, an upper slide protruding rearwardly from an upper portion of the drawer for preventing finely divided material from the chute from falling behind the drawer in said recess, and means for selecting any one of said selectable plurality of positions of partial extension of said drawer; the improvement comprising;

a lower slide beneath the drawer and having structure proportioned for use in pulling the lower slide outward in the recess and thereby extending the drawer to said selected one of said plurality of positions without spillage of said finely divided material, said structure including the lower slide having means for engaging the drawer and forcing the drawer outward with the lower slide to said position when the lower slide is pulled outward and for thereupon permitting the lower slide to be pushed rearwardly into said recess free of the drawer for releasing a said quantity of finely divided material through said drawer open bottom, the means for selecting defining a series of features spaced apart in height and distance along the drawer, an index on the housing, and means for pre-setting the index relative to any selected feature of said series of features for engagement with said feature on sliding of the drawer to a said selected position, and for preventing the drawer from moving rearward into the recess when said lower slide is pushed rearwardly.

2. In a system as recited in claim 1, said lower slide structure comprising said lower slide having an abutment in position for engaging the drawer for said extending of the drawer when the lower slide is pulled out.

3. In a system as recited in claim 2, a tab for manual manipulation of the lower slide extending laterally from below the lower slide and the drawer.

4. In a system as recited in claim 2, supportive structure in the housing, each of said upper slide and said lower slide being longer than said drawer and extending at all times through the supportive structure.

5. In a system as recited in claim 1, said drawer having a leading edge, and a said feature at the leading edge providing a zero drawer-extension position for said index in holding the drawer closed.

6. A dispensing system for finely divided material and having structure defining:

a housing including a downwardly tapered chute with open upper end and open lower end, structure defining a recess at the open lower end with first upper and second lower horizontal openings leading into said recess and with the front of the recess being open;

a drawer slidable in and out for extension from said recess and having an open top for receiving finely divided material from the chute, a first slider integral with said open top and extending through said first upper horizontal opening, an open bottom for dispensing finely divided material received, and a plurality of dividers defining a series of compartments along said drawer;

said first slider located in position on the drawer for preventing finely divided material from pouring behind the drawer, a second slider below said drawer for retaining said finely divided material in said compartments in said drawer and slidable in the recess along and beneath said drawer for releasing finely divided material from said compartments;

said second slider extending through said second lower horizontal opening, and means for fixing pre-determined slidable extensions of said drawer through said front opening and from said recess for adjusting pre-determined amounts of finely divided material to be released from said drawer upon sliding of said second slider into the recess, while preventing the drawer from sliding into said recess with the second slider.

7. In a system for dispensing finely divided material and having structure defining:

a housing with front, back, sides and upper and lower portions, a chute in the housing for containing said finely divided material and opening into a recess below the chute, a drawer in position in the recess for receiving said finely divided material from the chute and slidable from a position in the recess to a selected one of a plurality of positions partially extending from said recess, means for preventing said recess from receiving finely divided material from said chute, the drawer having open top and open bottom, a series of fixed members dividing the drawer into compartments providing different capacity corresponding respectively to said plurality of positions, and means for pre-determining a desired one of said plurality of positions and for limiting movement of the drawer thereto, the improvement comprising: a slider in position for movably opening and closing said drawer open bottom for receiving and for dispensing said finely divided material, and said slider having structure for forcing said drawer outward to any selected one of said pre-determined positions, on outward movement of the slider yet at the same time permitting the slider to be pushed freely and unobstructedly inward allowing dispensing of material from predetermined compartments of said drawer through said drawer open bottom, without movement of said drawer from said pre-determined position.

* * * * *